(12) United States Patent
Netto et al.

(10) Patent No.: US 9,866,619 B2
(45) Date of Patent: Jan. 9, 2018

(54) TRANSMISSION OF HIERARCHICAL DATA FILES BASED ON CONTENT SELECTION

(71) Applicant: International Business Machines Corporation, Armonk, NY (US)

(72) Inventors: Marco A. S. Netto, Sao Paulo (BR); Lucas C. V. Real, Sao Paolo (BR)

(73) Assignee: International Business Machines Corporation, Armonk, NY (US)

( * ) Notice: Subject to any disclaimer, the term of this patent is extended or adjusted under 35 U.S.C. 154(b) by 89 days.

(21) Appl. No.: 14/737,566

(22) Filed: Jun. 12, 2015

(65) Prior Publication Data
US 2016/0366209 A1    Dec. 15, 2016

(51) Int. Cl.
*H04L 29/08*    (2006.01)

(52) U.S. Cl.
CPC ............ *H04L 67/06* (2013.01); *H04L 67/104* (2013.01)

(58) Field of Classification Search
CPC ............ H04L 29/12028; H04L 12/462; H04L 12/4625; H04L 12/4633; H04L 12/4641; H04L 12/66; H04L 45/66; H04L 61/103; H04L 67/06; H04L 67/104
See application file for complete search history.

(56) References Cited

U.S. PATENT DOCUMENTS

| | | | |
|---|---|---|---|
| 6,704,730 B2 | 3/2004 | Moulton et al. | |
| 7,739,317 B2 * | 6/2010 | Asmi | G06F 17/30997 707/793 |
| 7,779,025 B2 | 8/2010 | Gunawardena et al. | |
| 8,392,370 B1 | 3/2013 | Whitney et al. | |
| 8,856,218 B1 | 10/2014 | Inskip | |
| 8,898,244 B2 | 11/2014 | Miglore | |
| 9,235,582 B1 * | 1/2016 | Madiraju Varadaraju | G06F 17/30088 |
| 2005/0144202 A1 * | 6/2005 | Chen | G06F 11/2066 |
| 2006/0202037 A1 * | 9/2006 | Gunawardena | G06F 19/3418 235/462.15 |
| 2009/0063698 A1 | 3/2009 | Xu et al. | |

(Continued)

OTHER PUBLICATIONS

Li et al.; "Parallel netCDF: A High-Performance Scientific I/O Interface"; ACM/IEEE; SC2003 Conference (SC'03); Nov. 15-21, 2003; Phoenix, Arizona, USA; Copyright @ 2003, ACM; pp. 1-11.

(Continued)

*Primary Examiner* — Brian J Gillis
*Assistant Examiner* — Amy Ling
(74) *Attorney, Agent, or Firm* — Edward P. Li (57) ABSTRACT

A method, a computer program product, and a computer system for transmitting a hierarchical data file from a first computer device to a second computer device. The first computer device receives a request for transmitting a first hierarchical data file. The first computer device modifies the first hierarchical data file based on a rule based filter. The first computer device receives from the second computer device a list of unique variables whose contents differ from contents in an existing file on the second computer device. The first computer device sends to the second computer device the contents of the unique variables. The contents of the unique variables are saved on the second computer device in a second hierarchical data file. The second hierarchical data file comprises pointers linking to contents of variables that are not the unique variables in the existing file.

18 Claims, 7 Drawing Sheets

(56) References Cited

U.S. PATENT DOCUMENTS

| | | | |
|---|---|---|---|
| 2010/0026842 A1* | 2/2010 | Ishizaka | G06F 17/30781 348/231.2 |
| 2010/0293142 A1 | 11/2010 | Ackerman et al. | |
| 2013/0144838 A1 | 6/2013 | Bhasin | |
| 2015/0052157 A1 | 2/2015 | Thompson | |
| 2016/0308812 A1* | 10/2016 | Johnstone | H04L 51/22 |

OTHER PUBLICATIONS

Podhorszki et al.; "XML Config File Format"; ADIOS 1.8 User's Manual; Chapter 5; Dec. 2014; Prepared by Oak Ridge National Laboratory; Oak Ridge, Tennessee; Managed by UT-BATTELLE, LLC; p. 47.

Su et al.; "Supporting User-Defined Subsetting and Aggregation over Parallel NetCDF Datasets";IEEE/ACM; 2012 12th IEEE/ACM International Symposium on Cluster, Cloud and Grid Computing; © 2012, IEEE; pp. 212-219.

Wang et al.; "SciMATE: A Novel MapReduce-Like Framework for Multiple Scientific Data Formats"; IEEE/ACM; 2012 12th IEEE/ACM International Symposium on Cluster, Cloud and Grid Computing; © 2012 IEEE; pp. 443-450.

"Appendix C File Format Specification"; Unidata; File Format Specification, The Net CDF Users' Guide; Printed on: Apr. 22, 2015; pp. 1-5; <http://www.unidata.ucar.edu/software/netcdf/docs/netcdf/File-Format-Specification.html>.

"HDF5 File Format Specification Version 2.0"; The HDF Group; Last Modified: Oct. 21, 2014; Printed on: Apr. 22, 2015; pp. 1-133; <http://www.hdfgroup.org/HDF5/doc/H5.format.html>.

"How Rsync Works: A Practical Overview"; Rsync; Printed on: Apr. 22, 2015; pp. 1-6; <https://rsync.samba.org/how-rsync-works.html>.

"Method and Apparatus to Perform Automated Data Migration Between Heterogeneous Data Sources"; An IP.com Prior Art Database Technical Disclosure; IPCOM000184153; Electronic Publication: Jun. 12, 2009; pp. 1-5.

* cited by examiner

TRANSMISSION OF HIERARCHICAL DATA FILES BASED ON CONTENT SELECTION

TECHNICAL FIELD OF THE INVENTION

The present invention relates generally to transmission data over a computer network, and more particularly to transmission of hierarchical data files over a computer network.

BACKGROUND

Data transfer is a common problem, especially due to the increasing data generation in recent years. Data needs to be transferred from one place to another, in order to be processed and stored for further analysis or backup. Traditionally, data files are transferred using techniques that analyze their data blocks. For some industries and scientific applications, data files are hierarchical, containing variable-value pairs; formats of these data files are, for example, HDF4, HDF5, NetCDF, and GRIB.

BitTorrent is based on the concept of "segmented file transfer", in which the original file is transferred from a variety of sources in chunks of fixed size. Implementation of BitTorrent may use a technology called SET (Similarity Enhanced Transfer) to accelerate download. SET technology finds similar copies of the file requested by the user and looks for subsets of those copies that match subsets of the requested file. If a similar copy is found, then the additional copies can be used as additional download sources. The technique used by SET is called handprinting, by which remote files are hashed using a dynamic window size (e.g. Rabin fingerprinting), and then a few selected hashes are inserted into a global lookup table. To find similar files, a receiver obtains the chunk hashes for its desired file and searches for matches in the global lookup table. A match indicates that the remote file(s) can be used as additional download source(s).

Deduplication utilizes a technique similar to that of SET. Hashes of the dynamic window size are computed for a set of files. Chunks with the same hash are then saved only once in the destination storage device, thus saving storage space. A rich software infrastructure needs to be developed on top of this functionality, in order to keep track of the number of references to each chunk. It is worth noting that a file may be sliced in hundreds or thousands of chunks, according to the parameters utilized by the hashing algorithm.

Rsync is used to transfer files from a sender to a receiver computer. A file list is prepared by the sender, including pathnames, ownership, access mode, permissions, size, and modification time stamp. A checksum can also be included in the file list. The file list is sent to the receiver computer, which checks whether the pathnames contained in the list exist in the local file system. The modification time stamp, size, and checksum are used to determine whether files can be skipped or not. If a file does not exist or if it exists but is outdated (or incomplete), then it is not eligible for skipping. In the case that the file does not exist at the destination, the file is sent in its whole by the sender. If partial data exists at the destination, then the sender only transfers the differences between that partial file (or an old copy of the file). The process happens by defining a block size (which may vary according to the file size), which is used to "slice" the file. The checksum of each slice is calculated and slices with the same checksum at both sender and receiver side are skipped. Slices with different checksums are transferred from the sender to the receiver and the old data at the receiver side is overwritten by the new data.

SUMMARY

In one aspect, a method for transmitting a hierarchical data file from a first computer device to a second computer device is provided. The method comprises the receiving by the first computer device a request for transmitting a first hierarchical data file from the first computer device to the second computer device. The method further comprises modifying the first hierarchical data file by the first computer device, based on a rule based filter requiring that a variable having not been accessed on the second computer device is not transmitted from the first computer device to the second computer device. The method further comprises receiving, by the first computer device from the second computer device, a list of unique variables whose contents differ from contents in an existing file on the second computer device. The method further comprises sending, from the first computer device to the second computer device, the contents of the unique variables. In the method, the contents of the unique variables are saved in a second hierarchical data file on the second computer device. In the method, the second hierarchical data file comprises pointers linking to contents of variables that are not the unique variables in the existing file.

In another aspect, a computer program product for transmitting a hierarchical data file from a first computer device to a second computer device is provided. The computer program product comprises a computer readable storage medium having program code embodied therewith. The program code is executable to: receive, by the first computer device, a request for transmitting a first hierarchical data file from the first computer device to the second computer device; modify, by the first computer device, the first hierarchical data file, based on a rule based filter requiring that a variable having not been accessed on the second computer device is not transmitted from the first computer device to the second computer device; receive, by the first computer device, from the second computer device, a list of unique variables whose contents differ from contents in an existing file on the second computer device; and send, by the first computer device, to the second computer device, the contents of the unique variables. The contents of the unique variables are saved in a second hierarchical data file on the second computer device. The second hierarchical data file comprises pointers linking to contents of variables that are not the unique variables in the existing file.

In yet another aspect, a computer system for transmitting a hierarchical data file from a first computer device to a second computer device is provided. The computer system comprises one or more processors, one or more computer readable tangible storage devices, and program instructions stored on at least one of the one or more computer readable tangible storage devices for execution by at least one of the one or more processors. The program instructions are executable to receive, by the first computer device, a request for transmitting a first hierarchical data file from the first computer device to the second computer device. The program instructions are executable to modify, by the first computer device, the first hierarchical data file, based on a rule based filter requiring that a variable having not been accessed on the second computer device is not transmitted from the first computer device to the second computer device. The program instructions are executable to receive, by the first computer device, from the second computer device, a list of unique variables whose contents differ from contents in an existing file on the second computer device. The program instructions are executable to send, by the first computer device, to the second computer device, the contents of the unique variables. The contents of the unique variables are saved in a second hierarchical data file on the second computer device. The second hierarchical data file comprises pointers linking to contents of variables that are not the unique variables in the existing file.

DETAILED DESCRIPTION

Embodiments of the present invention provide a system and method for performing efficient transference of hierarchical data files over a computer network from a source computer device to a destination computer device. The method explores the nature of hierarchical data files in order to reduce the amount of data transferred from the source computer device to the destination computer device over a computer network. The system monitors which content is already available in the destination computer device and avoids to send such content. The system and method monitors which content inside the hierarchical data files at the destination place have not been accessed, and automatically creates file transfer filters to save transfer time and storage space at the destination computer device. For example, there are several ways to filter the contents in the hierarchical data files: (1) notifying users of the advantages of the filtering in terms of, for instance, monetary costs and transfer speed; and (2) replacing the actual contents of the file at the destination computer device with pointers to the original contents at the source (which can be accessed by the destination only when required). The core idea of the system and method is to learn and automatically determine which subsets of variables in a file are consumed and which subsets are never consumed; therefore, the source computer device can skip sending the copy of the subsets that have never been consumed to the destination computer device in the future.

Most of scientific applications operate on hierarchical data files using file formats such as NetCDF and HDF. There are specific libraries to handle these types of files. These libraries have APIs to query the list of meta-data, variables and attributes of hierarchical data files and to access the actual contents of variables and attributes. By modifying these libraries, it is possible to track when applications request to access the contents of variables and attributes (by hooking into these libraries' APIs that perform the actions) and to monitor the access frequencies of these variables and attributes. By calculating checksums of the variables and attributes when creating new hierarchical files through these modified libraries, it is possible to query for duplicates of the data at the destination computer device and therefore save transfer time and cost if the duplicates already exist at the destination computer device. Similarly, the destination computer device can learn from the usage of the API to access existing files and migrate contents (variables and attributes) to cheaper storage devices. If the cheaper storage device is considered insecure, then the variables can be encrypted before being transmitted from the source computer device to the destination computer device.

Figure 1:
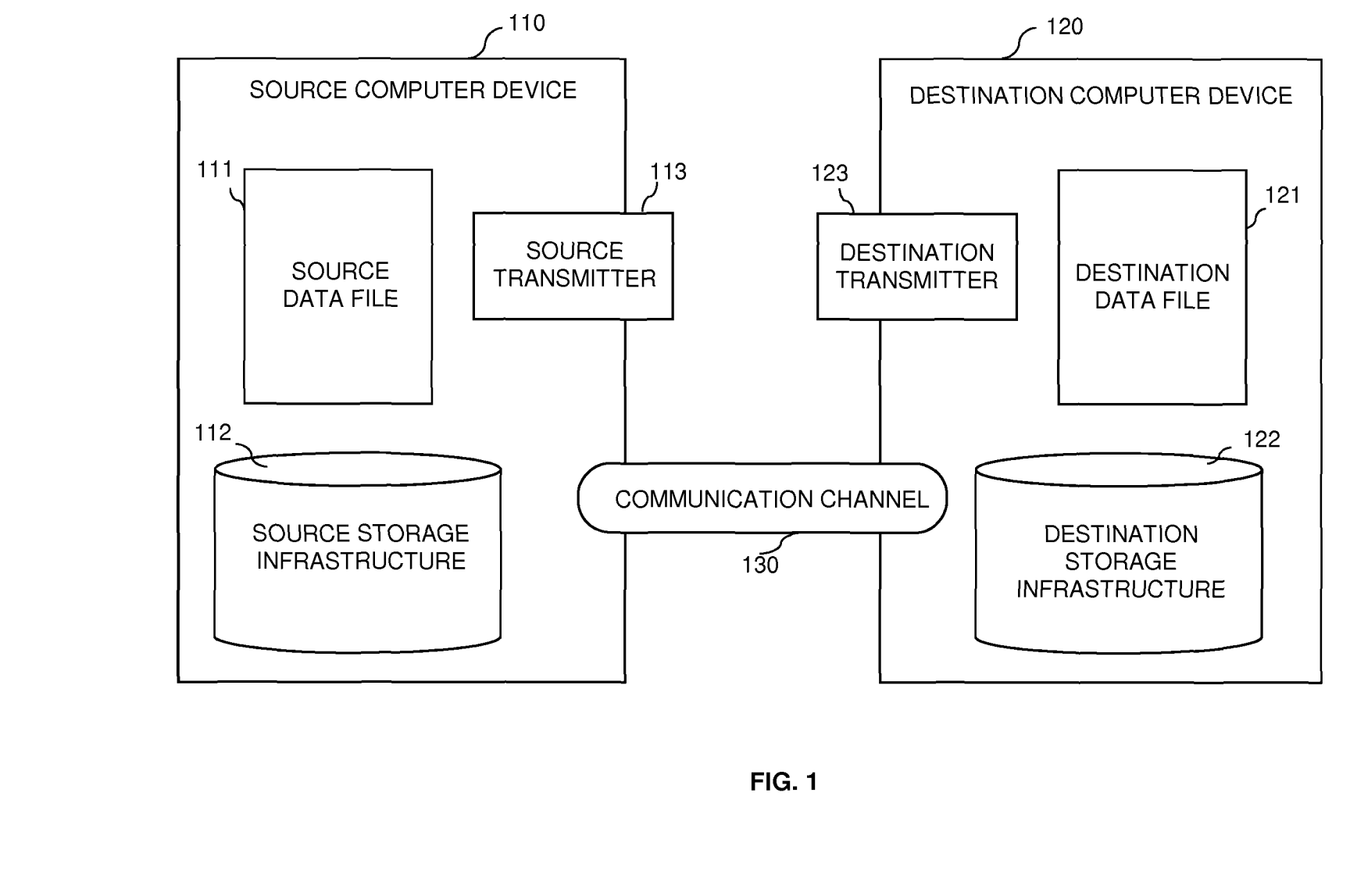
FIG. 1 is a diagram showing a source computer device and a destination computer device in transmission of hierarchical data files, in accordance with one embodiment of the present invention.

FIG. 1 is a diagram showing source computer device 110 and destination computer device 120 in transmission of hierarchical data files, in accordance with one embodiment of the present invention. A system and method provided in the present invention includes source computer device 110 and destination computer device 120. Between source computer device 110 and destination computer device 120, there is communication channel 130 which allows digital communication between the two computer devices.

Referring to FIG. 1, source computer device 110 includes source data file 111 which is a hierarchical data file to be transmitted or sent. Source computer device 110 further includes source storage infrastructure 112, which is, for example, a hard drive or a solid state disk. Source storage infrastructure 112 stores source data files including source data file 111. Source computer device 110 further includes source transmitter 113. Source transmitter 113 provided in the system and method of the present invention is used to transmit or send source data file 111 to destination computer device 120. Optionally, source transmitter 113 also receives from destination computer device 120 information about variables that have not been accessed in destination files on destination computer device 120. Source transmitter 113 will be discussed in detail in later paragraphs with reference to FIG. 2(A).

Referring to FIG. 1, destination computer device 120 includes destination data file 121 which is a hierarchical data file to be received. Destination data file 121 may not be the same as source data file 111 on source computer device 110. Destination computer device 120 further includes destination storage infrastructure 122, which is, for example, a hard drive or a solid state disk. Destination storage infrastructure 122 stores destination data files including destination data file 121. Destination computer device 120 further includes destination transmitter 123. Destination transmitter 113 provided in the system and method of the present invention is used to receive source data file 111 from source computer device 110. Optionally, destination transmitter 123 also sends resource computer device 110 information about variables that have not been accessed in destination files on destination computer device 120. Destination transmitter 123 will be discussed in detail in later paragraphs with reference to FIG. 2(B).

Figure 2A:
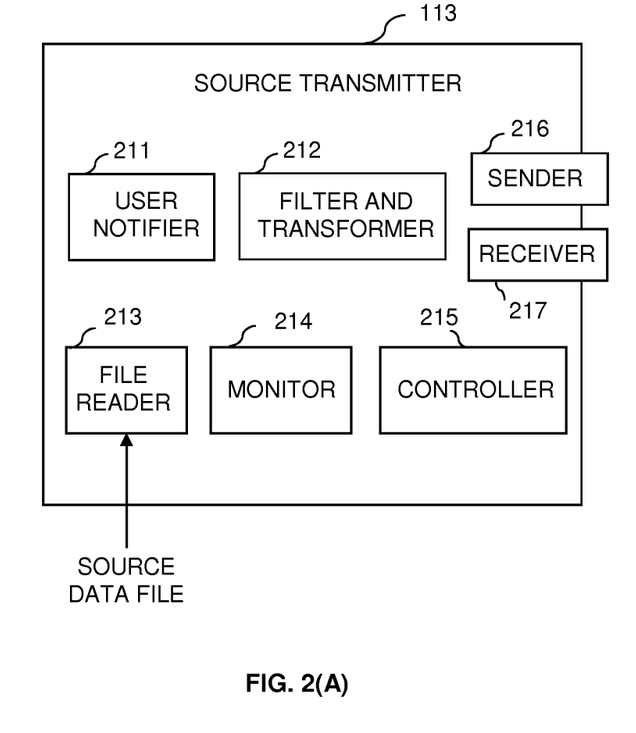
FIG. 2(A) is a diagram showing components of a source transmitter on a source computer device shown in FIG. 1, in accordance with one embodiment of the present invention.

FIG. 2(A) is a diagram showing components of source transmitter 113 on source computer device 110 shown in FIG. 1, in accordance with one embodiment of the present invention. Source transmitter 113 includes file reader 213 which reads source data files from source storage infrastructure 112 shown in FIG. 1. Source transmitter 113 further includes user notifier 211 which notifies users about the benefits of filtering and transforming the file before transmitting the file from source computer device 110 to destination computer device 120 (shown in FIG. 1). Source transmitter 113 further includes filter and transformer 212. Filter and transformer 212 filters source data file 111 shown in FIG. 1; for example, it removes variables that have not been accessed in destination files on destination computer device 120. Filter and transformer 212 also transforms source data file 111; for example, it replaces part of contents in source data file 111 with pointers, and these contents can be accessed by destination computer device 120 only when required. Filter and transformer 212 also calculates checksums of variables in source data file 111. Source transmitter 113 further includes sender 216. Through communication channel 130 shown in FIG. 1, sender 216 sends to destination computer device 120 metadata, variables, checksums of the variables and any other contents of source data file 111. Source transmitter 113 further includes receiver 217. Receiver 217 receives from destination computer device 120 information about (1) variables that need to be transmitted and (2) variables that have not been accessed in destination files on destination computer device 120. Source transmitter 113 further includes monitor 214 which receives from destination transmitter 123 shown in FIG. 1 notifications about the variables that have not been accessed and passes the information to controller 215 included in source transmitter 113. Controller 215 processes received information and determines whether source data file 111 needs filtering and transformation operations.

Figure 2B:
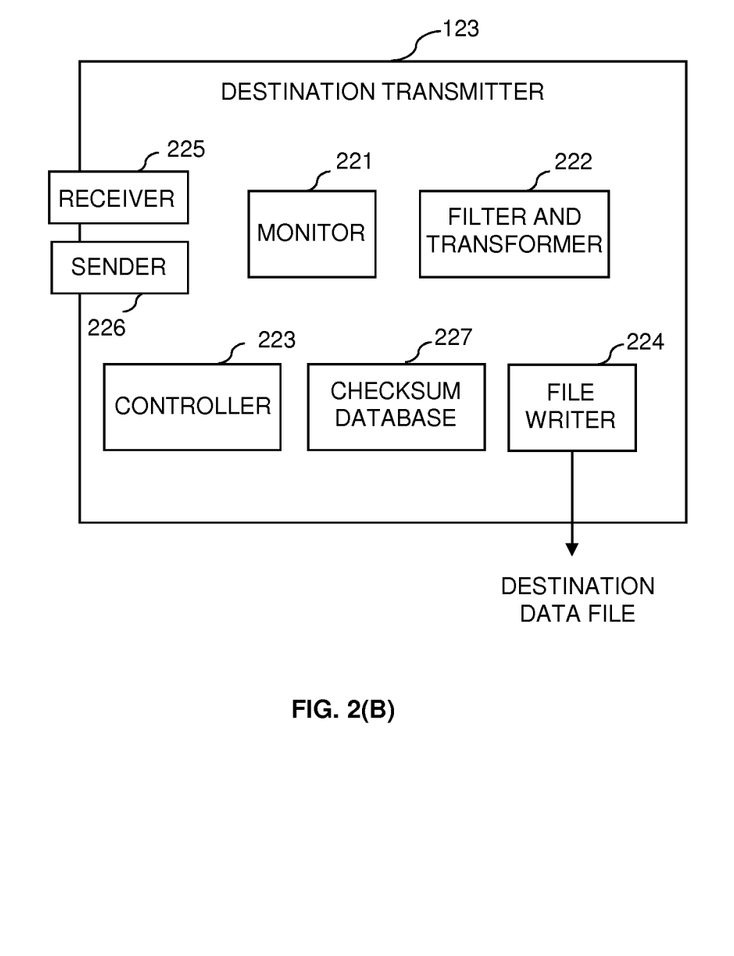
FIG. 2(B) is a diagram showing components of a destination transmitter on a destination computer device shown in FIG. 1, in accordance with one embodiment of the present invention.

FIG. 2(B) is a diagram showing components of destination transmitter 123 on destination computer device 120 shown in FIG. 1, in accordance with one embodiment of the present invention. Destination transmitter 123 includes receiver 225. Through communication channel 130 shown in FIG. 1, from source computer device 110 shown in FIG. 1, receiver 225 receives metadata, variables, checksums of the variables and any other contents of source data file 111 shown in FIG. 1. Destination transmitter 123 further includes monitor 221. Monitor 221 monitors how destination data files are used (for example, which variables are accessed and which other variables are not accessed). Monitor 221 also monitors whether two or more variables from different destination data files have the exactly same contents. Destination transmitter 123 further includes filter and transformer 222. Filter and transformer 222 transforms files. For example, if monitor 221 detects that a checksum of a variable in a transmitted file sent form source computer device 110 matches a checksum of a variable in an existing file on destination computer device 120, then filter and transformer 222 modifies a header of the transmitted file to point to the variable in the existing file on destination computer device 120; therefore, the variable in the transmitted file will not be transmitted. Destination transmitter 123 further includes file writer 224 which writes transmitted data files (destination data files) to destination storage infrastructure 122 shown in FIG. 1. Destination transmitter 123 further includes controller 223. Destination transmitter 123 further includes controller 223 which collects information from monitor 221. Controller 223 also determines when destination computer device 120 sends a notification to source computer device 110; the notification includes information on variables that have not been accessed on destination computer device 120. Based on the information, controller 215 (shown in FIG. 2(B)) on source computer device 110 determines whether source data file 111 (shown in FIG. 2(B)) on source computer device 110 needs filtering and transformation operations. Destination transmitter 123 further includes sender 226 which sends the information collected by controller 223 to source computer device 110. Destination transmitter 123 further includes checksum database 227. Checksum database 227 stores checksums of variables in source data files and is updated by monitor 221. In other embodiments, the checksums may be stored on destination storage infrastructure 122 (shown in FIG. 1) on destination computer device 120.

Figure 3:
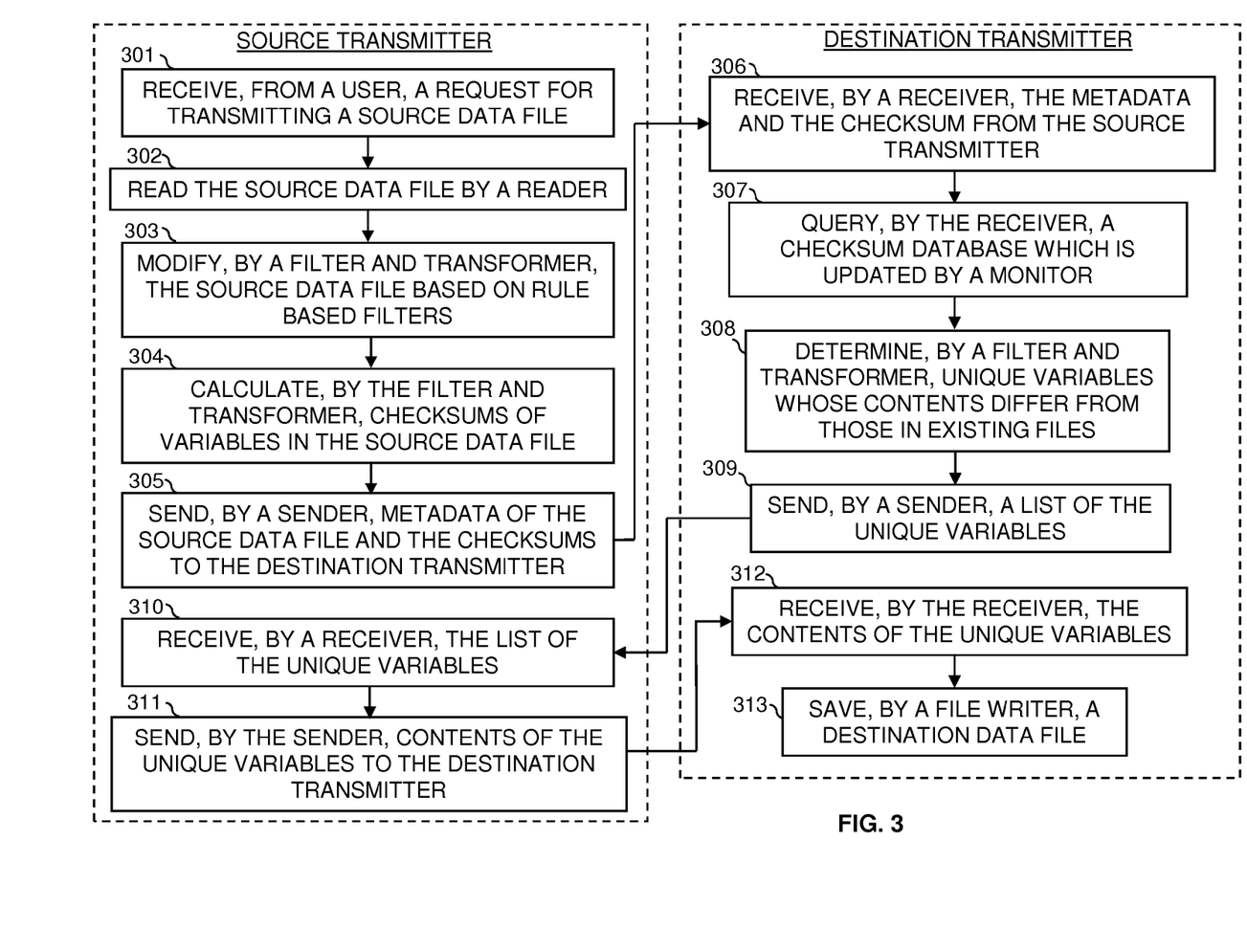
FIG. 3 is a flowchart showing operational steps for transmitting a hierarchical data file from a source computer device to a destination computer device shown in FIG. 1, in accordance with one embodiment of the present invention.

FIG. 3 is a flowchart showing operational steps for transmitting a hierarchical data file from source computer device 110 to destination computer device 120 shown in FIG. 1, in accordance with one embodiment of the present invention. At step 301, source transmitter 113 shown in FIG. 1 and FIG. 2(A) receives, from a user, a request for transmitting source data file 111 (shown in FIG. 1) from source computer device 110 to destination computer device 120. Source data file 111 is a hierarchical data file to be transmitted or sent. At step 302, file reader 213 (shown in FIG. 2(A)) on source transmitter 113 reads source data file 111.

At step 303, filter and transformer 212 (shown in FIG. 2(A)) on source transmitter 113 modifies the source data file based on rule based filters. The rules are set by controller 215 on source transmitter 113 (shown in FIG. 2(A)), according to access patterns of destination files on destination computer device 120. The setting-up of the rule based filter will be discussed in latter paragraphs with reference to FIG. 4. Filter and transformer 212 filters source data file 111 shown in FIG. 1; for example, it removes variables that have not been accessed in destination files on destination computer device 120. Filter and transformer 212 also transforms source data file 111; for example, it replaces part of contents in source data file 111 with pointers and these contents can be accessed by destination computer device 120 only when required.

At step 304, filter and transformer 212 calculates checksums for one or more variables in source data file 111. At step 305, sender 216 (shown in FIG. 2(A)) on source transmitter 113 sends metadata of source date file 111 and the checksums to destination transmitter 123 shown in FIG. 1 and FIG. 2(B).

At step 306, receiver 225 (shown in FIG. 2(B)) on destination transmitter 123 receives the metadata of source date file 111 and the checksums. At step 307, receiver 225 queries checksum database 227 (shown in FIG. 2(B)) which is periodically updated by monitor 221 (shown in FIG. 2(B)) on destination transmitter 123. The update of checksum database 227 will be discussed in later paragraphs with reference to FIG. 4.

At step 308, filter and transformer 222 (shown in FIG. 2(B)) on destination transmitter 123 determines unique variables whose contents differ from those in existing files on destination computer device 120. At step 309, sender 226 (shown in FIG. 2(B)) on destination transmitter 123 sends a list of the unique variables determined at step 308.

At step 310, receiver 217 (shown in FIG. 2(A)) on source transmitter 113 receives the list of the unique variables. At step 311, sender 216 on source transmitter 113 sends contents of the unique variables to destination computer device 120.

At step 312, receiver 225 on destination transmitter 123 receives the contents of the unique variables. At step 313, file writer 224 (shown in FIG. 2(B)) on destination transmitter 123 saves destination data file 121 (shown in FIG. 1) on destination storage infrastructure 122 (shown in FIG. 1) on destination computer device 120. Destination data file 121 includes the contents of the unique variables sent at step 311 from sender 216 on source transmitter 113. For variables in source data file 111 on source computer device 110 matching checksums of variables in an existing file on destination computer device 120, file writer 224 sets pointers in a header of destination data file 121 linking to the variables in the existing file on destination computer device 120.

Figure 4:
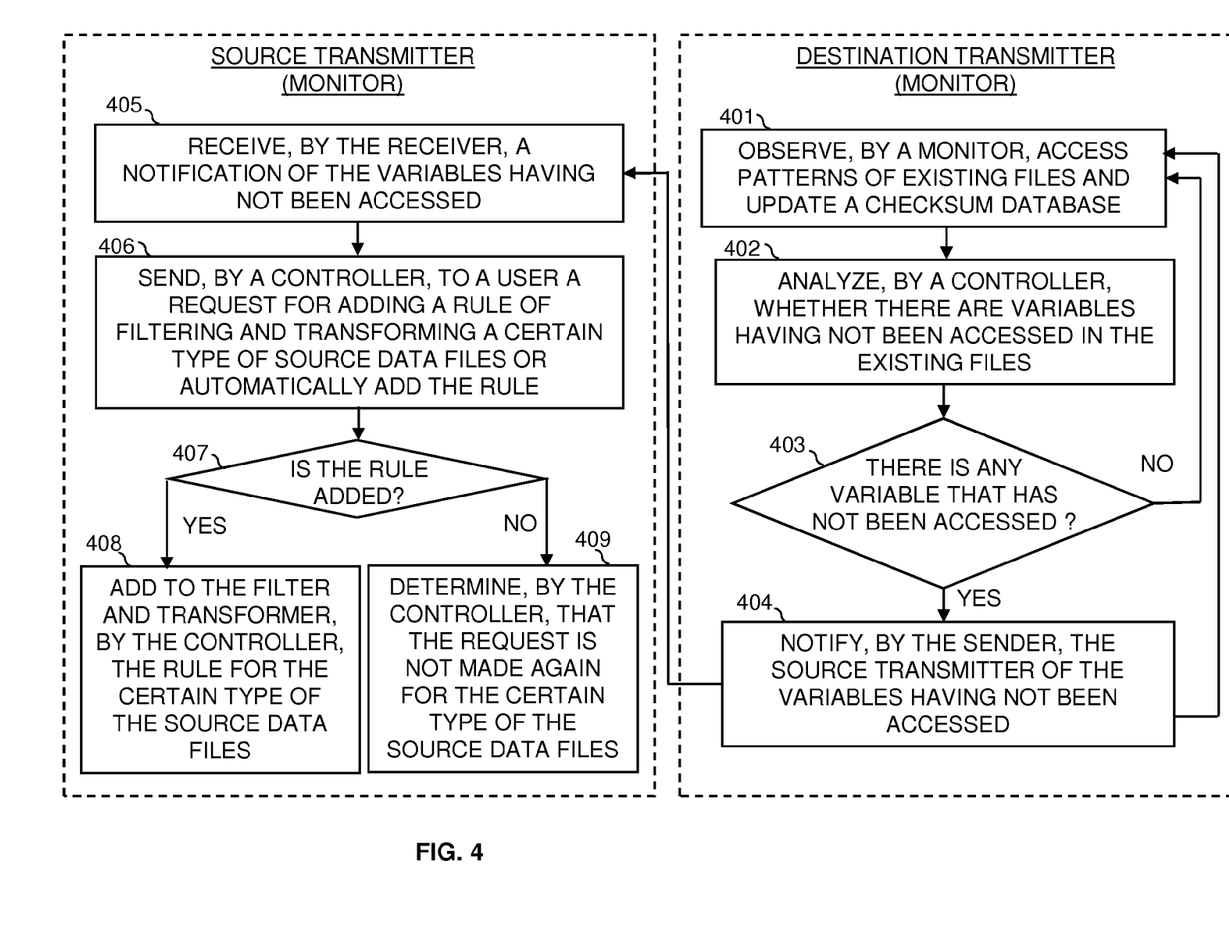
FIG. 4 is a flowchart showing operational steps for updating a checksum database shown in FIG. 2(B) and for setting up a rule based filter for filtering and transforming source data files, in accordance with one embodiment of the present invention.

FIG. 4 is a flowchart showing operational steps for updating checksum database 227 shown in FIG. 2(B) and for setting up a rule based filter for filtering and transforming source data files on source computer device 110, in accordance with one embodiment of the present invention. At step 401, monitor 221 on destination transmitter 123 (shown in FIG. 2(B)) observes access patterns of existing files on destination computer device 120 and updates checksum database 227. At step 402, controller 223 (shown in FIG. 2(B)) on destination transmitter 123 analyzes whether there are variables that have not been accessed in existing files on destination computer device 120.

At decision step 403, controller 223 determines whether there is any variable that has not been accessed. In response to determining that there is no variable that has not been accessed (NO branch of decision step 403), destination transmitter 123 reiterates step 401. In response to determining that there is the variable that has not been accessed (YES branch of decision step 403), sender 226 (shown in FIG. 2(B)) on destination transmitter 123 notifies source transmitter 113 (shown in FIG. 1 and FIG. 2(A)) of the variables that have not been accessed. After step 404, destination transmitter 123 reiterates step 401; this indicates that the monitoring process is continual.

At step 405, receiver 217 on source transmitter 113 (shown in FIG. 2(A)) receives, from sender 226 on destination transmitter 123, a notification of the variables having not been accessed. At step 406, controller 215 (shown in FIG. 2(A)) on source transmitter 113 send a user a request for adding a rule of filtering and transforming a certain type of source data files. In other embodiments, controller 215 may automatically add the rule.

At decision step 407, controller 215 on source transmitter 113 determines whether the rule is added. In determining that the rule is added (YES branch of decision step 407), controller 215 adds the rule to filter and transformer 212 (shown in FIG. 2(A)) on source transmitter 113. In determining that the rule is not added (NO branch of decision step 407), controller 215 determines that the request is not made again for the certain type of source data files.

Figure 5:
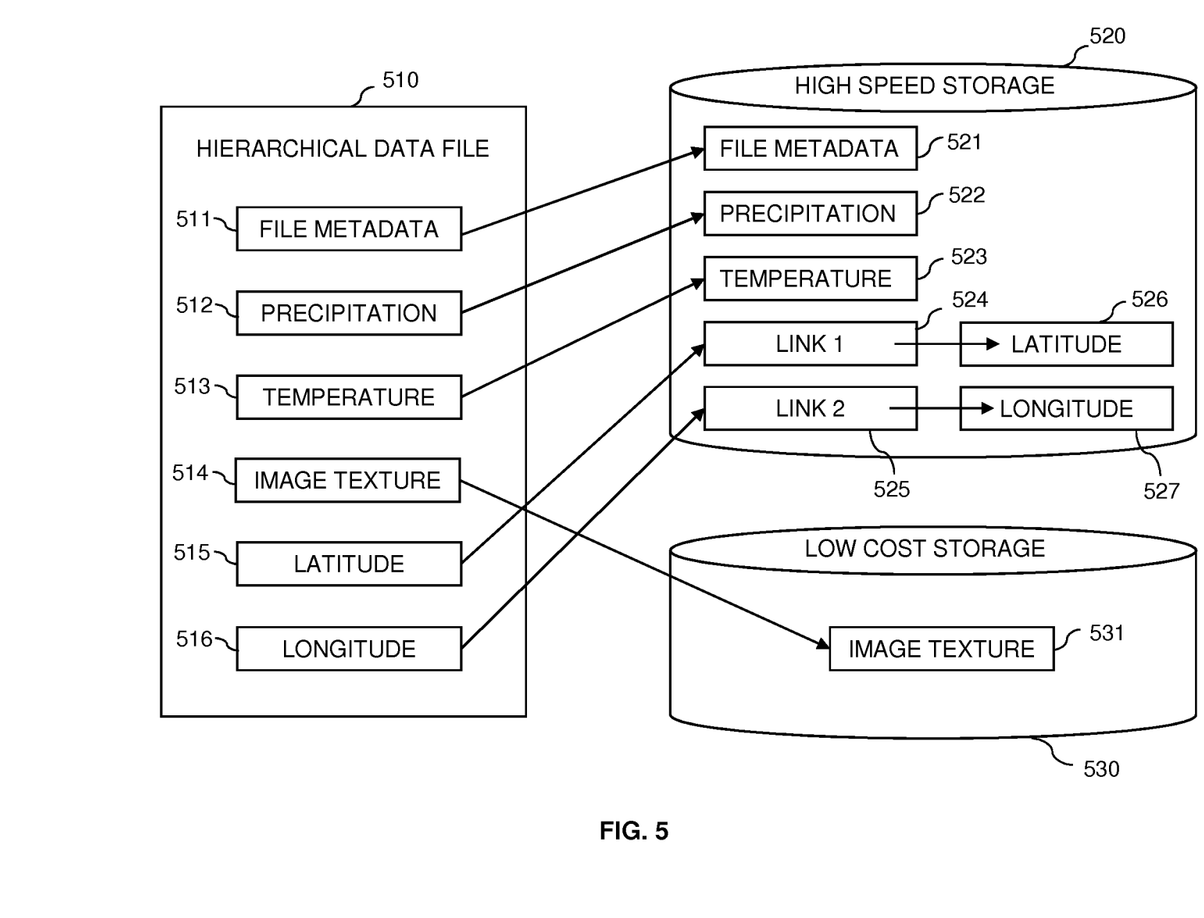
FIG. 5 is a diagram showing an example of transmitting a hierarchical data file of weather forecast data, in accordance with one embodiment of the present invention.

FIG. 5 is a diagram showing an example of transmitting a hierarchical data file of weather forecast data, in accordance with one embodiment of the present invention. At a source computer device (e.g., source computer device 110 shown in FIG. 1), a user runs a weather forecast software that generates hierarchical data files with weather information at different periods of a day. The hierarchical data files are transmitted to a destination computer device, (e.g., destination computer device 120 shown in FIG. 1) and are visualized by another user. Each file contains a list of variable-value pairs. An example of a hierarchical data file format is as follows.

```
my_filename {
  dimensions:
    columns = 100;
    rows = 200;
  variables:
    precipitation(columns, rows);
    precipitation:checksum = 1d935cdd40b72dabf4af49bca5452a01;
    temperature(columns, rows);
    temperature:checksum = df6fe820657dbcbe9f0b0e1b5696449a;
    latitude(columns, rows);
    longitude(columns, rows);
    image_texture(columns, rows);
    image_texture.external_file=
      "tcp://192.168.1.102/home/user/texture.dat";
  global_attributes:
    forecast_start_date = 20150210;
    forecast_end_date = 20150212;
    forecast_county = "Santa Clara";
  data:
    precipitation:
      0 0 0 0 0 0 0 0 0 0 0 0 0 0 0 0 0 0 0 0 0 0 0 0 0 0 0 0 0 0 0 0
      0 0 0 0
      ...
    temperature:
      31 31 31 31 31 31 31 31 30 30 30 30 30 30 30 30 29 29 29 29
      29 30
      ...
    latitude:
      ...
    longitude:
      ...
}
```

The system and method of the present invention can automatically detect what subsets of variable in the hierarchical data files are accessed by the user visualizing the files at the destination computer device (e.g., destination computer device 120 shown in FIG. 1). The source computer device (e.g., source computer device 110 shown in FIG. 1) transmitting the hierarchical data files notifies a sender (e.g., sender 216 shown in FIG. 2(A)) on the source computer device that some remaining variables are not accessed by the user at the destination computer device (e.g., destination computer device 120 shown in FIG. 1) and suggests to transmit only a subset of variables to the destination computer device.

The rules for filtering and transforming the hierarchical data files are set up on the source computer device. In this example, two rules have been set up on the source computer device (e.g., source computer device 110 shown in FIG. 1). The two rules are as follows:
 skip.variables=latitude, longitude
 skip.global_attributes=forecast_county
The first rule indicates that the variables of "latitude" and "longitude" do not need to be transmitted to the destination computer device. The second rule indicates that the global attribute of "forecast_county" also does not need to be transmitted.

Referring to FIG. 5, hierarchical data file 510 includes file metadata 511, precipitation 512, temperature 513, image texture 514, latitude 515, and longitude 516. Hierarchical data file 510 is stored on the source computer device (e.g., source computer device 110 shown in FIG. 1), and variables in the file can be transmitted to high speed storage 520 or low cost storage 530 both on the destination computing device (e.g., destination computer device 120 shown in FIG. 1). In other embodiments, high speed storage 520 and low cost storage 530 may respectively reside on different destination computer devices. Frequently accessed variables and metadata are kept on high speed storage 520. In this example, file metadata 511, precipitation 512, temperature 513, latitude 515, and longitude 516 are transmitted to high speed storage 520. Rarely accessed variables and metadata are kept onto low cost storage 530. In this example, image texture 514 is transmitted to low cost storage 530.

Referring to FIG. 5, file metadata 511, precipitation 512, and temperature 513 are transmitted from the source computer device (e.g., source computer device 110) to high speed storage 520 on the destination computing device (e.g., destination computer device 120) and saved as file metadata 521, precipitation 522, and temperature 523 on high speed storage 520. However, the latitude and longitude variables has been already available on high speed storage 520 shown as latitude 526 and longitude 527. From the checksums of these two variables sent from the source computer device (e.g., source computer device 110), the destination computer device (e.g., destination computer device 120) determines that the contents of these two variables on the source computer device do not differ from the contents of the two variables in an existing file on high speed storage 520. Therefore, link 1 524 and link 2 525 are created respectively for linking to latitude 526 and longitude 527 in the existing file on high speed storage 520. Image texture 514 is transmitted from the source computer device (e.g., source computer device 110) to low cost storage 530 and saved as image texture 531.

Figure 6:
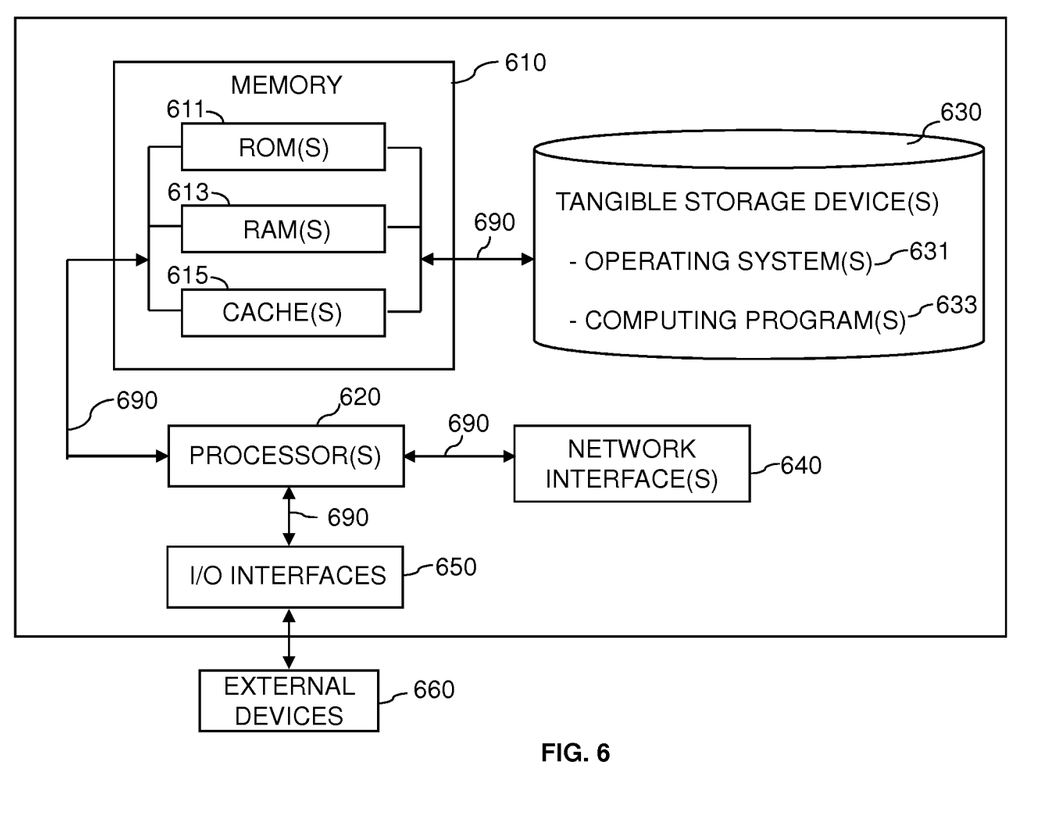
FIG. 6 is a diagram illustrating components of a source computer device or a destination computer device shown in FIG. 1, in accordance with one embodiment of the present invention.

FIG. 6 is a diagram illustrating components of source computer device 110 or destination computer device 120 shown in FIG. 1, in accordance with one embodiment of the present invention. It should be appreciated that FIG. 6 provides only an illustration of one implementation and does not imply any limitations with regard to the environment in which different embodiments may be implemented.

Referring to FIG. 6, source computer device 110 or destination computer device 120 includes processor(s) 620, memory 610, and tangible storage device(s) 630. In FIG. 6, communications among the above-mentioned components of source computer device 110 or destination computer device 120 are denoted by numeral 690. Memory 610 includes ROM(s) (Read Only Memory) 611, RAM(s) (Random Access Memory) 613, and cache(s) 615. One or more operating systems 631 and one or more computer programs 633 reside on one or more computer readable tangible storage device(s) 630. Source computer device 110 or destination computer device 120 further includes I/O interface(s) 650. I/O interface(s) 650 allows for input and output of data with external device(s) 660 that may be connected to source computer device 110 or destination computer device 120. Source computer device 110 or destination computer device 120 further includes network interface(s) 640 for communications between source computer device 110 or destination computer device 120 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the FIGs illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the FIGs. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for transmitting a hierarchical data file from a first computer device to a second computer device, the method comprising:
   receiving, by the first computer device, a request for transmitting a first hierarchical data file from the first computer device to the second computer device;
   modifying, by the first computer device, the first hierarchical data file by replacing content of a variable with a pointer which is used by the second computer device to access the content of the variable in an existing file on the second computer device, based on a rule based filter, wherein the variable has not been accessed on the second computer device, wherein the rule based filter is based on a notification received from the second computer device and the notification notifies the first computer device that the variable is not transmitted from the first computer device to the second computer device;
   receiving, by the first computer device, from the second computer device, a list of unique variables whose contents differ from contents in the existing file on the second computer device;
   sending, by the first computer device, to the second computer device, the contents of the unique variables;
   wherein the contents of the unique variables are saved in a second hierarchical data file on the second computer device; and
   wherein the second hierarchical data file comprises the pointer linking to the content of the variable in the existing file on the second computer device.

2. The method of claim 1, further comprising:
   calculating, by the first computer device, checksums of variables in the first hierarchical data file; and
   sending, by the first computer device, metadata and the checksums to the second computer device.

3. The method of claim 2, further comprising:
   receiving, by the second computer device, from the first computer device, the metadata and the checksums;
   querying, by the second computer device, a checksum database on the second computer device;
   determining, by the second computer device, the unique variables; and
   sending, by the second computer device, to the first computer device, the list of the unique variables.

4. The method of claim 1, further comprising:
   receiving, by the second computer device, from the first computer device, the contents of the unique variables;
   saving, by the second computer device, the contents of the unique variables in the second hierarchical data file on the second computer device; and
   setting, by the second computer device, in the second hierarchical data file, the pointers for the contents of the variables that are not the unique variables, wherein the pointers link the second hierarchical data file to the existing file.

5. The method of claim 1, further comprising:
   observing, by the second computer device, access patterns of the existing file;
   determining, by the second computer device, whether there is the variable having not been accessed on the second computer device; and
   sending, by the second computer device, to the first computer device the notification about the variable having not been accessed on the second computer device, in response to determining that whether there is the variable having not been accessed on the second computer device.

6. The method of claim 5, further comprising:
   receiving, by the first computer device, from the second computer device, the notification; and
   adding, by the first computer device, the rule based filter requiring that the variable having not been accessed on the second computer device is not transmitted from the first computer device to the second computer device.

7. A computer program product for transmitting a hierarchical data file from a first computer device to a second computer device, the computer program product comprising a computer readable storage medium having program code embodied therewith, the program code executable to:
   receive, by the first computer device, a request for transmitting a first hierarchical data file from the first computer device to the second computer device;
   modify, by the first computer device, the first hierarchical data file by replacing content of a variable with a pointer which is used by the second computer device to access the content of the variable in an existing file on the second computer device, based on a rule based filter, wherein the variable has not been accessed on the second computer device, wherein the rule based filter is based on a notification received from the second computer device and the notification notifies the first computer device that the variable is not transmitted from the first computer device to the second computer device;

receive, by the first computer device, from the second computer device, a list of unique variables whose contents differ from contents in the existing file on the second computer device;

send, by the first computer device, to the second computer device, the contents of the unique variables;

wherein the contents of the unique variables are saved in a second hierarchical data file on the second computer device; and wherein the second hierarchical data file comprises the pointer linking to the content of the variable in the existing file on the second computer device.

8. The computer program product of claim 7, further comprising the program code executable to:

calculate, by the first computer device, checksums of variables in the first hierarchical data file; and send, by the first computer device, metadata and the checksums to the second computer device.

9. The computer program product of claim 8, further comprising the program code executable to:

receive, by the second computer device, from the first computer device, the metadata and the checksums;

query, by the second computer device, a checksum database on the second computer device;

determine, by the second computer device, the unique variables; and send, by the second computer device, to the first computer device, the list of the unique variables.

10. The computer program product of claim 7, further comprising the program code executable to:

receive, by the second computer device, from the first computer device, the contents of the unique variables;

save, by the second computer device, the contents of the unique variables in the second hierarchical data file on the second computer device; and set, by the second computer device, in the second hierarchical data file, the pointers for the contents of the variables that are not the unique variables, wherein the pointers link the second hierarchical data file to the existing file.

11. The computer program product of claim 7, further comprising the program code executable to:

observe, by the second computer device, access patterns of the existing file;

determine, by the second computer device, whether there is the variable having not been accessed on the second computer device; and send, by the second computer device, to the first computer device the notification about the variable having not been accessed on the second computer device, in response to determining that whether there is the variable having not been accessed on the second computer device.

12. The computer program product of claim 11, further comprising the program code executable to:

receive, by the first computer device, from the second computer device, the notification; and add, by the first computer device, the rule based filter requiring that the variable having not been accessed on the second computer device is not transmitted from the first computer device to the second computer device.

13. A computer system for transmitting a hierarchical data file from a first computer device to a second computer device, the computer system comprising:

one or more processors, one or more computer readable tangible storage devices, and program instructions stored on at least one of the one or more computer readable tangible storage devices for execution by at least one of the one or more processors, the program instructions executable to:

receive, by the first computer device, a request for transmitting a first hierarchical data file from the first computer device to the second computer device;

modify, by the first computer device, the first hierarchical data file by replacing content of a variable with a pointer which is used by the second computer device to access the content of the variable in an existing file on the second computer device, based on a rule based filter, wherein the variable has not been accessed on the second computer device, wherein the rule based filter is based on a notification received from the second computer device and the notification notifies the first computer device that the variable is not transmitted from the first computer device to the second computer device;

receive, by the first computer device, from the second computer device, a list of unique variables whose contents differ from contents in the existing file on the second computer device;

send, by the first computer device, to the second computer device, the contents of the unique variables;

wherein the contents of the unique variables are saved in a second hierarchical data file on the second computer device; and wherein the second hierarchical data file comprises the pointer linking to the content of the variable in the existing file on the second computer device.

14. The computer system of claim 13, further comprising the program instructions executable to:

calculate, by the first computer device, checksums of variables in the first hierarchical data file; and send, by the first computer device, metadata and the checksums to the second computer device.

15. The computer system of claim 14, further comprising the program instructions executable to:

receive, by the second computer device, from the first computer device, the metadata and the checksums;

query, by the second computer device, a checksum database on the second computer device;

determine, by the second computer device, the unique variables; and send, by the second computer device, to the first computer device, the list of the unique variables.

16. The computer system of claim 13, further comprising the program instructions executable to:

receive, by the second computer device, from the first computer device, the contents of the unique variables;

save, by the second computer device, the contents of the unique variables in the second hierarchical data file on the second computer device; and set, by the second computer device, in the second hierarchical data file, the pointers for the contents of the variables that are not the unique variables, wherein the pointers link the second hierarchical data file to the existing file.

17. The computer system of claim 13, further comprising the program instructions executable to:

observe, by the second computer device, access patterns of the existing file;
determine, by the second computer device, whether there is the variable having not been accessed on the second computer device; and
send, by the second computer device, to the first computer device the notification about the variable having not been accessed on the second computer device, in response to determining that whether there is the variable having not been accessed on the second computer device.

18. The computer system of claim 17, further comprising the program instructions executable to:
receive, by the first computer device, from the second computer device, the notification; and
add, by the first computer device, the rule based filter requiring that the variable having not been accessed on the second computer device is not transmitted from the first computer device to the second computer device.

* * * * *